United States Patent [19]
Mahoney

[11] Patent Number: 5,134,350
[45] Date of Patent: Jul. 28, 1992

[54] DOOR CONTROLLER FOR MASS TRANSIT VEHICLES

[76] Inventor: John C. Mahoney, 25751 Johnson Memorial, Belle Plaine, Minn. 56011

[21] Appl. No.: 687,746

[22] Filed: Apr. 19, 1991

[51] Int. Cl.$^5$ ............................................. E05F 15/20
[52] U.S. Cl. .................................. 318/466; 318/467; 105/341
[58] Field of Search ............... 318/264, 265, 266, 286, 318/466, 467, 468; 105/341, 343, 348, 463.1; 180/14.1, 271, 274, 279, 281, 286, 289; 307/9.1

[56] References Cited

U.S. PATENT DOCUMENTS

| | | | |
|---|---|---|---|
| 3,575,604 | 4/1971 | Smith | 307/9.1 |
| 3,824,538 | 7/1974 | Slemp | 180/272 |
| 4,679,508 | 7/1987 | Fruehan et al. | 105/341 |
| 4,896,050 | 1/1990 | Shin-chung | 180/281 X |
| 4,981,084 | 1/1991 | Templeton et al. | 105/341 |
| 5,039,925 | 8/1991 | Schap | 318/282 |

FOREIGN PATENT DOCUMENTS

| | | | |
|---|---|---|---|
| 3809591 | 10/1989 | Fed. Rep. of Germany | 180/281 |
| 54-45024 | 4/1979 | Japan | 105/341 |

Primary Examiner—Bentsu Ro

[57] ABSTRACT

A door opening system particularly suited for doors on mass transit vehicles. Through position sensing, electronic circuitry, mechanical linkage, brushless motor and pwm amplifier; opens and closes one or more doors, inhibits vehicle from running when door is open, allows vehicle to run when door is closed and not pushed back, stops moving vehicle when door opens beyond the push back position. This system does not depend on the mechanical linkage that opens and closes the door to sense the position of the door.

6 Claims, 4 Drawing Sheets

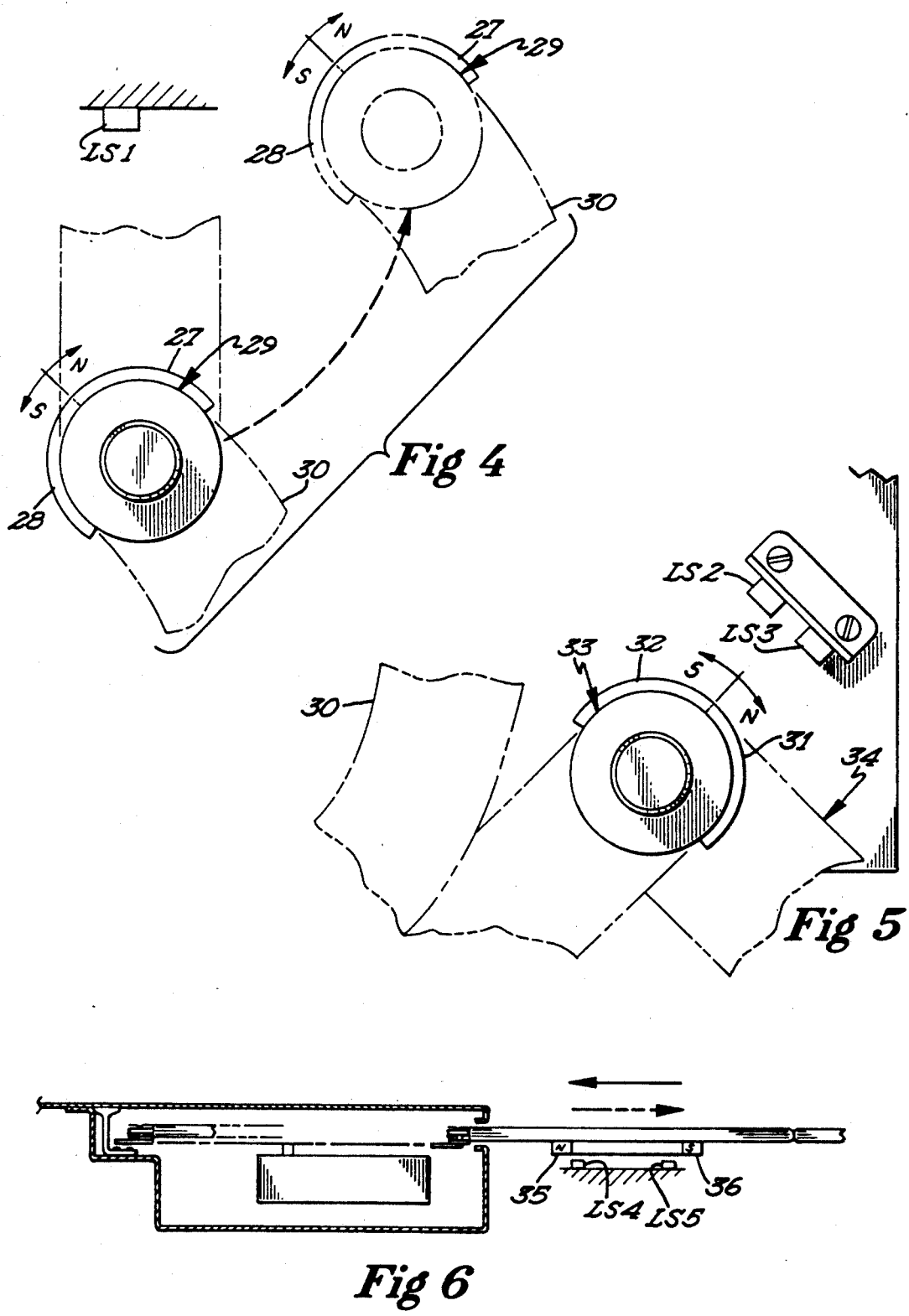

DOOR CONTROLLER FOR MASS TRANSIT VEHICLES

FIELD OF THE INVENTION

This invention relates in general to door control systems particularly to door control systems used on mass transit vehicles.

BACKGROUND OF THE INVENTION

There are various types of door control systems used to control the doors on mass transit vehicles. Present door control systems are some what exemplified by the systems disclosed in U.S. Pat. No. 4,491,917; U.S. Pat. No. 1,849,516; U.S. Pat. No. 2,096,043; U.S. Pat. No. 3,537,403; U.S. Pat. No. 1,906,699; and U.S. Pat. No. 3,782,034.

A major short coming of the approach utilized in these prior art systems is that the position of the door is sensed using the position of the mechanical linkage that is used to actuate the door. If the door becomes disconnected from its actuating linkage or if the position sensor fails from mechanical wear, the vehicle will be allowed to start even though the door may be in the open condition, or the door may open while the vehicle is in motion and the vehicle will continue to move. Additionally, the present prior art system deactivates the door monitoring control systems after the train or vehicle has begun movement in order to prevent nuisance stopping of the vehicle caused by inadvertent operation of the push back mechanism for the door. People have been killed and injured because doors on transit vehicles have been opened and the vehicle has continued in motion or started in motion. The invention disclosed herein provides a means of detecting the actual physical position of the door independent of the linkage mechanism that actuates the door. The electronic circuitry senses and determines whether the door is closed, pushed back, or opened; and prevents the vehicle from starting its movement if the door is not closed and instantaneously stops the vehicle if the door is opened.

Mechanical wear of switches is a major maintenance problem in the door control systems of transit vehicles. The present invention uses non contacting switches which eliminate this mechanical wear problem.

SUMMARY OF THE INVENTION

It is an object of this invention to provide an improved safety control system for use with transit vehicles and which is operable to instantaneously stop the vehicle when a vehicle door or doors are opened.

A further object of this invention is to provide a novel door control system which improves reliability in the operation of transit vehicles by eliminating mechanically actuated switches and brush motors and replacing these components with electro-magnetically actuated switches and brushless servo motors.

The further object of this invention is to provide an easier and more accurate door set up system through the use of LED's (light emitting diodes) which turn on and off with the state changes of the various position sensors and also provide visual feed back on the position of the sensor with respect to the position of the door and door actuator.

FIGURES OF THE DRAWING

FIG. 1 is an electrical schematic diagram of the logic control circuitry,

FIG. 2 is an electrical schematic diagram of the brushless motor comutator circuitry, FIG. 3 is a diagrammatic plan view of the mechanical linkage and brushless motor which is interconnected to and controls shifting movement of a vehicle door between open and closed positions, FIG. 4 is a diagrammatic plan view of a sensing assembly associated with the linkage of FIG. 3 illustrated in door closed position in full line configuration and illustrated in door open position in dotted line configuration, FIG. 5 is a top plan view similar to FIG. 4 and illustrating a pair of sensor assemblies associated with the mechanical linkage of FIG. 3 and, FIG. 6 is a diagrammatic plan view of a vehicle door illustrated in the closed condition and illustrating a pair of sensor assemblies which sense the position of the door.

DESCRIPTION OF THE PREFERRED EMBODIMENT

Figure 1:
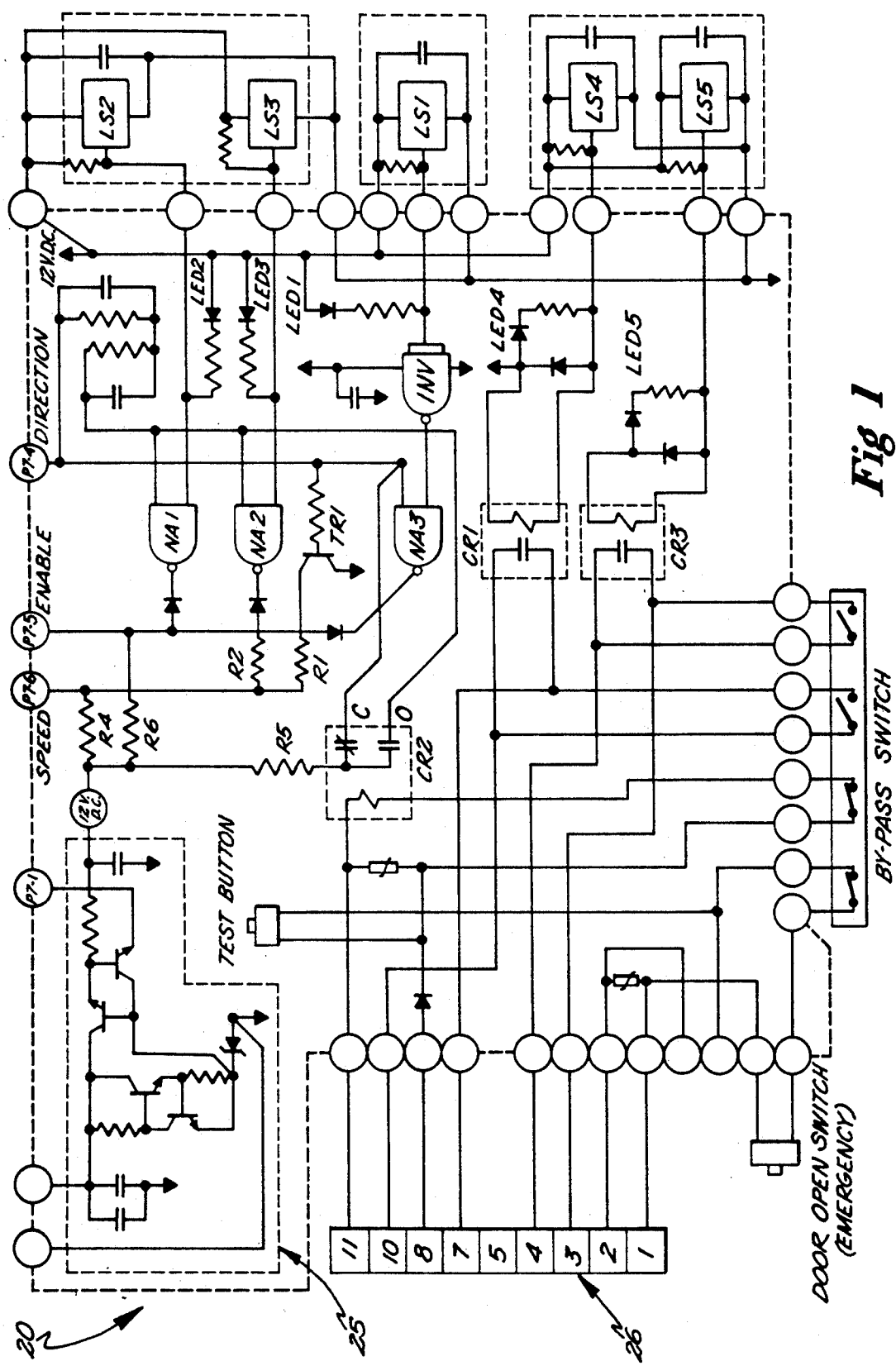
Figure 2:
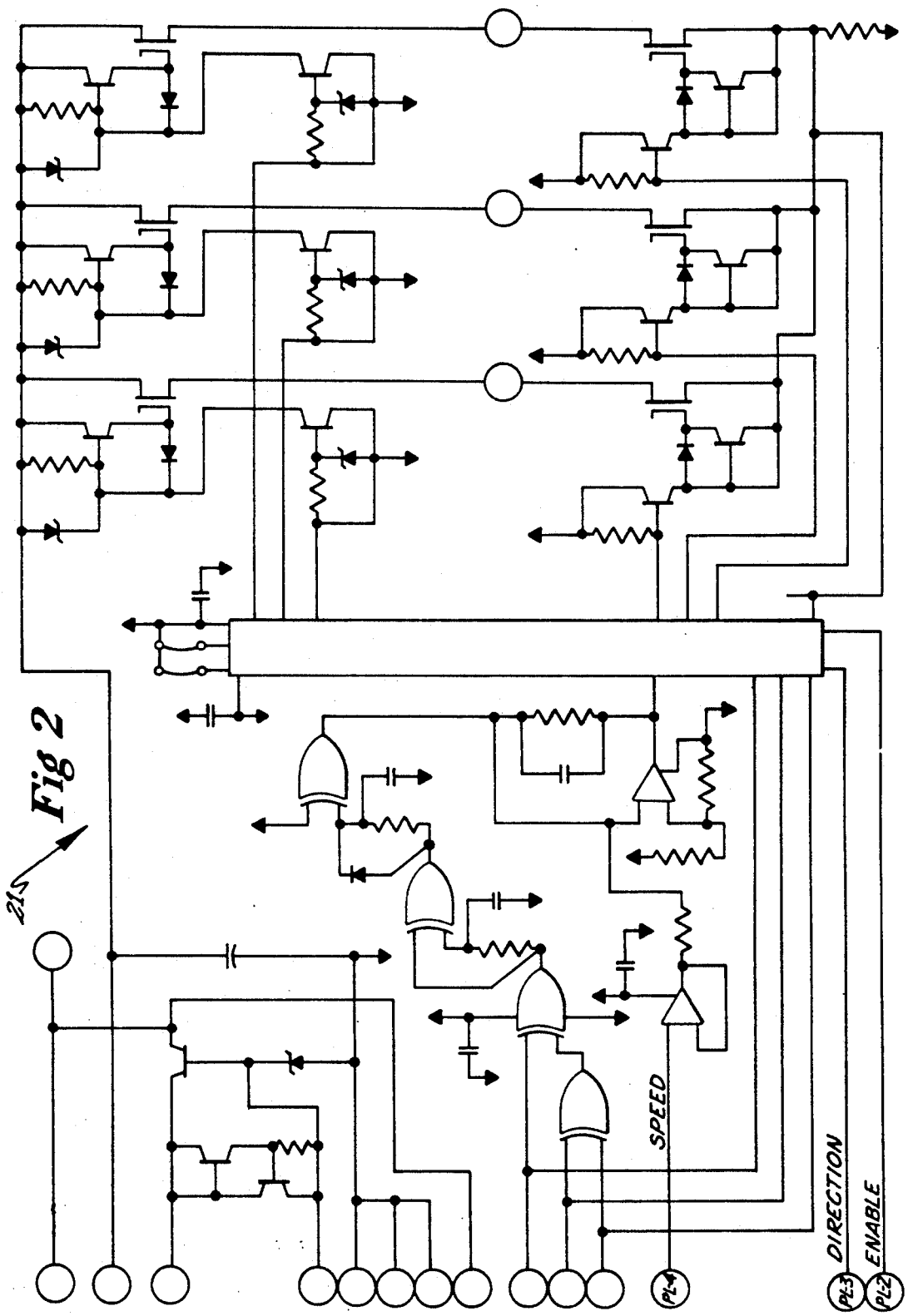

Referring now to the drawings, it will be seen that FIG. 1 is an electrical schematic diagram of the logic control circuitry or control card 20 for the door controller of a vehicle door for a mass transit vehicle such as subway. Although not shown in the drawing, the logic control circuitry 20 is electrically connected to the primary control system for the mass transit vehicle which controls movement of the vehicle. The logic control circuitry 20 is electrically connected in controlling relation to the amplifier or brushless motor commutator circuitry 21 illustrated in FIG. 2.

Figure 3:
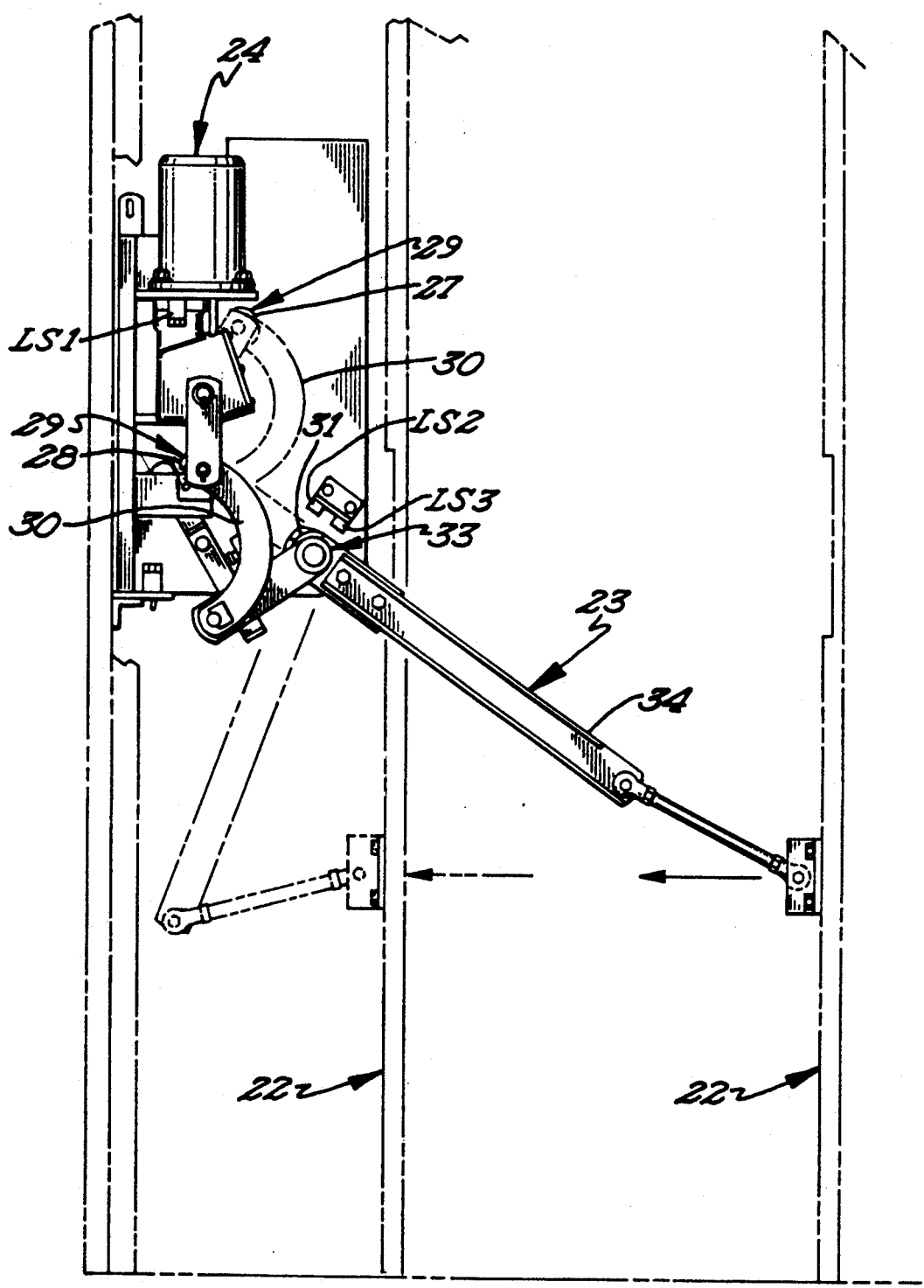

The door controller comprising the present invention enables or inhibits the operation of the mass transit vehicle in response to the position of a vehicle door 22 as illustrated in FIG. 3. Shifting movement of the vehicle door 22 between open and closed positions is accomplished through the linkage 23 which is power actuated by the brushless electric motor 24. The linkage 23 is of conventional construction and operation and is generally illustrated in U.S. Pat. No. 3,537,403. The disclosure of that U.S. Pat. No. 3,537,403 as it relates to the door actuating linkage is incorporated herein by reference.

The brushless electric motor 24 is a conventional commercial type such as those manufactured by Fanuc, a Japanese company, Indromat, a German company, or Reliance Electric Company, of Cleveland, Ohio. The logic control circuitry 20 is provided with a power supply 25 which consists of a 12 volt DC (12Vdc) power supply. The logic control circuitry also includes a terminal block 26 which is electrically connected to the primary vehicle control system which operates the mass transit vehicle.

The amplifier (FIG.2) that drives the brushless electric motor 24 that opens and closes a vehicle door 22 has three inputs from the logic control circuitry (FIG. 1). The inputs are direction, speed and enable. Enable P7-5 (FIG. 1) and P1-2(FIG.2) inhibits the amplifier and removes power from the motor when it is low and enables the amplifier to drive the motor when it is high. Direction P7-4 (FIG. 1) and P1-3 (FIG. 2) tells the amplifier to drive the motor in the direction to open the door when it is low and in the direction to close the door when it is high. Speed P7-6 (FIG. 1) P1-4 (FIG. 2) controls the motor speed which is proportional to the voltage between P7-6 (FIG. 1) P1-4 (FIG. 2) and common.

When the vehicle comes to a stop, the primary vehicle control sends a high signal to terminals 8 with respect to terminal 11 of the terminal block 26 (FIG. 1) which causes relay CR2 (FIG. 1) to switch from line close to line open making line open high and line close low. NA1, NA2, and NA3 are NAND gates with blocking diodes. The output of a NAND gate is high except when both inputs are high then the output of a NAND gate is low. NA1 and NA3 operate the amplifier enable. It is pointed out that all of the hall cells LS1, LS2, LS3, LS4 and LS5 illustrated in FIG. 1 are all hall effect devices that generate an electrical potential in response to the application of an external magnetic field. Referring now to FIG. 4, it will be seen that a pair of magnets 27, 28 are mounted on sleeve 29 secured to the link 30. Movement of the link 30 and sleeve 29 shifts the position of the magnets 27, 28 with respect to the hall cell LS1. It is pointed out that the outer surface of magnet 27 which faces hall cell LS1 comprises the north pole of magnetic 27 while the rear surface constitutes the south pole. Conversely, the outer surface of magnet 28 constitutes the south pole while the inner surface constitutes the north pole of magnet 28.

The output of hall cells LS1 (FIG. 1) is inverted and appears high to NA3 (FIG. 1) when the output of LS1 (FIG. 1) is low. At the instant relay CR2 (FIG. 1) switches to door open, all the hall cell outputs are low. NA3 and NA1 do not have both inputs in the high state so their outputs are both high which causes P7-5 (FIG. 1) to be high and enables the amplifier. The door close line is the door direction signal. When CR2 (FIG. 2) is in the door open state, the door close line which is attached to P7-4 is low. The motor will rotate in the direction to open the door.

The speed will be determined by the ratio of the resistance from P7-6 (FIG. 1) and common and resistor R4 (FIG. 1). The amplifier and control card have the same common. Initially the door open input to NA2 (FIG. 1) is high and the LS3 (FIG. 1) input is low which causes the output of NA2 to be high. The series resistance of R2 (FIG. 1) and NA2 (FIG. 1) to common will be infinite. The base of transistor TR1 will be low which turns TR1 off. The series resistance of R1 and TR1 will be infinite the resistance of P1-4 (FIG. 2) to common is also very large therefore all the voltage from the 12 Vdc (FIG. 1) supply will appear across P1-4 (FIG. 2) and common which commands the motor to run at full speed.

It will be seen in FIG. 5 that magnets 31, 32 are mounted on sleeve 33 of link 34 and are disposed in opposed relation to hall cells LS2 and LS3. The magnet 31 has its north pole as its outer face and the magnet 32 has its south pole as its outer face. The sleeve 33 turns as the link 34 is shifted which changes the orientation of the magnets 31, 32 with respect to the hall cells LS2 and LS3. As the door opens the north pole of the magnets 31, 32 mounted on the mechanical linkage in the door panel (FIG. 3, and 5) will move away from hall cell LS3 (FIG. 6) (FIG.4) and be replaced by a south pole causing the output of hall cell LS3 (FIG. 1) to change state from low to high. When the output of LS3 goes high both inputs to NA2 (FIG. 1) will be high and the output of NA2 (FIG. 1) will be low. Current will conduct from the 12 Vdc supply (FIG. 1) through R4 (FIG. 1) and R2 (FIG. 1) to common. The voltage from P1-4 (FIG. 2) to common will be given by the formula 12 Vdc times R2 divided by the sum of R2 plus R4. If R2 is small compared to R4 the motor will rotate at a much lower speed until the magnets 31, 32 (FIG. 3 and 5) switches the output of LS2 (FIG. 3 and 5) to the high state. When the output of LS2 (FIG. 1) goes high both inputs to NA1 (FIG. 1) will be high and the output of NA1 will go low allowing the blocking diode to conduct causing P7-5 (FIG. 1) to go low and inhibit the amplifier which stops the motor. The door will stop in the open position.

To close the door, the train control sends a low signal (zero voltage) between terminals 8 and 11 (FIG. 1). A low signal between terminals 8 and 11 (FIG. 1) will cause the output of CR2 (FIG. 1) to switch from the door open line to the door close line. The door open line will go low and the door close line will go high. When the door open line goes low, the output of NA1 (FIG. 1) will go high and enable the amplifier. The door close line will be high which makes the motor rotate in the direction to close the door. The output of NA2 (FIG.1) will be high which stops current flow through R2 (FIG. 1).

The base of transistor TR1 (FIG. 1) will be high turning transistor TR1 on causing current flow through R1 (FIG. 1). The speed at which the motor will rotate will be determined by the formula 12 Vdc times R1 divided by the sum of R1 plus R4 (FIG. 1). The motor will continue to rotate in the door close direction until the magnet 27 (FIG. 3 and 4) causes the output of LS1 (FIG. 3 and 4) to go low. The output of LS1 (FIG. 1) is inverted and will appear high to the input of NA3 (FIG. 1) causing both inputs to be high and switching the output of NA3 (FIG. 1) low which inhibits the amplifier causing the motor to stop with the door mechanical linkage in the closed position.

Referring now to FIG. 6, it will be seen that hall cells LS4 and LS5 are mounted on the door track of the vehicle adjacent the position of the door when the door is fully opened or partially opened. Elongate magnets 35, 36 are positioned on the door and the magnetic field will be sensed by the hall cells LS4 and LS5 during movement of the vehicle door. The outer surface of magnet 35 comprises the north pole of the magnet, and the outer surface of the magnet 36 comprises the south pole of the magnet 36.

The magnet (FIG. 6) mounted on the door (FIG. 6) and the hall cells LS4 and LS5 (FIG. 1 and 6) mounted on the door track (FIG. 6) directly read the position of the door. As the vehicle stops the primary vehicle control enables the vehicle inhibit circuit connected to terminals 7 and 10 (FIG. 1). When the door opens the magnets 35, 36 (FIG. 6) move past LS4 (FIG. 6) changing from a north to a south pole which causes the output of hall cell LS4 (FIG. 1) to switch from low to high which opens normally opening relay CR1 (FIG. 1). When CR1 opens, terminal 10 and terminal 7 (FIG. 1) are no longer shorted producing an open signal which inhibits vehicle motions until a closed signals on terminals 7 and 10 are received simultaneously from all the doors. As the door continues to move in the direction to open, the output of hall cell LS5 (FIG. 1) will go high as the south pole passes it. When LS5 goes high, the normally open contacts of relay CR3 will open and interrupt the connection between terminals 3 and 4 (FIG. 1) which inhibits vehicle motion.

As the door closes the north pole of the door magnet (FIG. 6) passed hall cells LS4 and LS5 (FIG. 6) causing them to go low and close normally open relays CR1 and CR2 which shorts terminals 3 and 4 (FIG. 1) and terminals 7 and 10 (FIG. 1). When the primary transit vehicle control receives simultaneous closed signals on (terminals 7 and 10) (FIG. 1) from all of the vehicle doors and all of the signals from (terminals 3 and 4) (FIG. 1) (door open) are closed, the transit vehicle may begin to move. Once the vehicle has begun motion, the primary vehicle control disables the door closed vehicle inhibit circuit (terminals 7 and 8) (FIG. 1) to prevent nuisance tripping by vandals playing with the push back device. The door is opened circuit terminals 3 and 4 (FIG. 1) is always enabled and will inhibit vehicle motion any time hall cell LS5 (FIG. 1) output is low. Hall cell LS5 is positioned so that on a door that has a push back device, the travel distance of the pushback device will not cause hall cell LS5 to activate the door open signal (terminals 3 and 4).

Each hall cell has a corresponding LED mounted on the control card (FIG. 1) that turns on when the cell is in the low state and off when the cell is in the high state. These LED's can be used to make mechanical adjustments during setup. A setup procedure is: disconnect the motor leads from connector P2 (FIG. 2) on the amplifier board. Close the door and home the mechanical linkage. All of the LED's should be on. If any of the LED's are not on then adjust the position of the corresponding magnets and/or sensor boards to that all the LED's are on when the door is fully closed. Hold the mechanical linkage in place and operate the push back device the LED for LS4 (FIG. 1) should turn off. The LED for LS5 (FIG. 1) should remain on. If they do not, adjust the position of the sensor board. Next, fully open the door all of the LED's should be off. Adjust the magnet associated with LS2 (FIG. 1) so that it's LED turns off just just as the door is fully open. Slowly close the door. The LED for LS4 should turn on just as the door closes. The LED for LS1 (FIG. 1) should turn on just as the mechanical linkage reaches the closed positions, recounted the motor leads and you are finished.

Although hall effect sensors are the preferred embodiment of the instant invention, other non-contact sensors may also be used. For example, inductive proximity probe sensors may also be used. The inductive proximity probe produces an electromagnetic field which would be disposed in the path of the vehicle door. Movement of the door through the field would be sensed by a detector and an output signal would be generated.

An optical coupler type detector could also be used including a photo-electric cell. The coupler would be mounted so that movement of the door would break the beam in a given position. An ultrasonic proximity sensor could also be used to sense the position of the vehicle door.

It will be seen that I have provided a novel door controller which is high effective in sensing the position of the vehicle door but which is subject to little or no wear. Thus it will be seen that I have provided a novel and improved door controller for mass transit vehicles which functions in a more efficient manner than any heretofore known comparable controllers.

What is claimed is:

1. A door controller for transient vehicles having one or more doors and having a primary control system for controlling movement of the vehicle, mechanical linkage shiftably interconnecting each door to the vehicle for shifting movement between open and closed positions, an electric motor connected to the linkage for actuating the same, electronic logic control circuitry connected to a power supply and connected in controlling relationship with the vehicle door opening and closing sequence in response to the primary control system, sensing means mounted on the vehicle remote from and independent of the door shifting linkage including a pair of hall effect sensor cells adjacent the door and a pair of magnets on the door, each magnet having one pole facing a hall effect sensor cell, the sensor cell-facing pole of one magnet being opposite that of an adjacent magnet, said hall effect sensor cells being responsive to flux reversals for sensing the position of the door, said hall affect sensor cells generating a door closed signal when the vehicle door is in the fully closed position to enable the primary control system through the logic control circuitry to permit movement of the vehicle, said hall effect sensor cells generating a door open signal when the door is opened to inhibit the primary control system and prevent movement of the vehicle, one of said hall effect sensor cells operatively cooperating with one of said magnets to permit movement of the door to a partially opened push back position without flux reversal occurring and without inhibiting the primary control system of the vehicle when vehicle is in motion.

2. The door controller as defined in claim 1 wherein said electric motor comprises a brushless electric motor.

3. The door controller as defined in claim 1 further comprising a plurality optical indicator devices in said logic control circuitry, said optical indicator devices each being electrically connected to one of said hall effect sensor cells, each optical indicator device being energized when its associated hall effect sensor cell or magnets is mispositioned, said optical indicator devices being effective in indicating mispositioning of hall effect sensor cells and magnets during installation of said controller device.

4. The door controller as defined in claim 1 wherein the states of individual door position sensed by said hall effect sensor cells mounted adjacent each door is indicated by lights.

5. The door controller as defined in claim 1 wherein said magnets on a door are of elongate configuration, one of said magnets having a sensor cell-facing pole of a length to permit the door to be moved from the fully closed position to the partially opened push back position without the occurrence of flux reversal.

6. The door controller as defined in claim 1 further includes a plurality of hall effect sensor cells mounted adjacent said door linkage and a plurality of magnets mounted on said linkage, said hall effect sensor cells mounted adjacent said linkage cooperating with said magnets on said door linkage to sense and control the movement of the door.

* * * * *